United States Patent
Deloche et al.

(10) Patent No.: US 8,292,186 B2
(45) Date of Patent: Oct. 23, 2012

(54) SECURITY DOCUMENT INCLUDING AN RFID DEVICE

(75) Inventors: Manuel Deloche, Serris (FR); Frederic Vicentini, Sucy en Brie (FR)

(73) Assignee: Arjowiggins Security Integrale Solutions, Jouy sur Morin (FR)

( * ) Notice: Subject to any disclaimer, the term of this patent is extended or adjusted under 35 U.S.C. 154(b) by 465 days.

(21) Appl. No.: 12/526,461

(22) PCT Filed: Feb. 27, 2008

(86) PCT No.: PCT/FR2008/050331
§ 371 (c)(1),
(2), (4) Date: Oct. 13, 2009

(87) PCT Pub. No.: WO2008/119904
PCT Pub. Date: Oct. 9, 2008

(65) Prior Publication Data
US 2010/0025477 A1    Feb. 4, 2010

(30) Foreign Application Priority Data
Feb. 28, 2007 (FR) ...................................... 07 01461

(51) Int. Cl.
*G06K 19/06* (2006.01)
(52) U.S. Cl. ........................................ 235/488; 235/492
(58) Field of Classification Search .................. 235/487, 235/492, 493, 375, 435, 488
See application file for complete search history.

(56) References Cited

U.S. PATENT DOCUMENTS

| 6,569,508 B2 * | 5/2003 | Babb et al. ................... 428/40.1 |
| 2005/0040242 A1 * | 2/2005 | Beenau et al. ................ 235/492 |
| 2005/0247794 A1 | 11/2005 | Jones et al. |
| 2007/0123001 A1 * | 5/2007 | Reis ............................... 438/462 |
| 2008/0042849 A1 * | 2/2008 | Saito et al. .................. 340/572.7 |
| 2008/0111674 A1 * | 5/2008 | Quine ........................... 340/501 |
| 2009/0315320 A1 * | 12/2009 | Finn ............................. 283/107 |

FOREIGN PATENT DOCUMENTS

| EP | 0 676 715 A2 | 10/1995 |
| WO | WO 01/57312 A1 | 8/2001 |
| WO | WO 2004/039604 A1 | 5/2004 |
| WO | WO 2005/056304 A1 | 6/2005 |
| WO | WO 2005/062244 A1 | 7/2005 |

OTHER PUBLICATIONS

ISO/IEC 7810:2003(E); *Identification cards—Physical characteristics*; International Standard; Nov. 2003.

* cited by examiner

*Primary Examiner* — Thien M Le
(74) *Attorney, Agent, or Firm* — Oliff & Berridge, PLC

(57) ABSTRACT

The invention relates to a security document including a fiber inner layer including at least one security element, a recto outer layer and a verso outer layer, the two outer layers being made of a transparent thermoplastic material, and an RFID device, the RFID device being housed within at least one inner layer of transparent or translucent material. The invention also provides a method of fabricating the security document.

36 Claims, 2 Drawing Sheets

SECURITY DOCUMENT INCLUDING AN RFID DEVICE

The present invention relates to a security document, in particular an identity document, to a method of fabricating it, and to its use.

Nowadays, not only states, but also private organizations issue numerous security documents that need to present a high level of protection, while nevertheless making it easy for agents or inspection devices to verify their authenticity. This applies in particular to identity documents such as ID cards, passports, driving licenses, and also documents such as secure access cards, transport tickets, or tickets to cultural or sports events, for example, and subscription cards.

In order to increase the security level of security documents and make them difficult or impossible to counterfeit, more and more security documents have been proposed over the last ten years that are provided with radiofrequency identification (RFID) devices. Such RFID devices, e.g. chips associated with respective antennas, present a great advantage in that they make it possible to store and possibly also to modify information specific to the bearer, to the type of document issued, and to a history of events.

Application EP 0 676 715 discloses a security document including an RFID device, said document being constituted by a plurality of layers of plastics material, including an inner layer that is capable of receiving printing and an outer layer that is transparent. That security document presents several drawbacks. A plastics layer cannot be provided with security elements such as watermarks. Such elements present a high level of security since they cannot be reproduced by means such as photocopying, while also being inexpensive in terms of production costs. Furthermore, such a multilayer structure made solely out of plastics material presents a limited lifetime because of the risk of the structure becoming delaminated. Numerous security documents, and in particular identity documents issued by states, need to have a lifetime of not less than ten years.

Application EP 1 556 228 discloses a security document including a security paper layer surrounded on either side by two transparent plastics layers, the paper layer possibly being provided with an RFID device. That security document presents a drawback in that the RFID device can be seen through the layers of transparent plastics material, thus making it easier for potential counterfeiters to falsify.

There exists a constant need to strengthen the security of identity documents.

The object of the present invention is thus to propose a security document including an RFID device that presents a high level of security and of resistance to falsification.

Another object of the invention is to propose a security document that includes an RFID device, the presence of which cannot be detected visually or by feel.

Another object of the invention is to propose a method of fabricating said security document that is simple, fast, and inexpensive.

The various objects of the invention are achieved by proposing a security document comprising a fiber inner layer including at least one security element, a recto outer layer, and a verso outer layer, said outer layers being made of a transparent thermoplastic material, and an RFID device, the RFID device being housed within at least one inner layer of transparent or translucent material.

The security document of the invention includes an RFID device housed within at least one transparent or translucent layer, which together constitutes a layer also referred to in the present description as an "inlay layer".

According to the invention, said "recto outer layer" is the outer layer of transparent thermoplastic material that faces the fiber layer and said "verso outer layer" is the outer layer of transparent thermoplastic material that faces the inlay layer.

The security document of the invention thus presents the advantage of including a security fiber layer. The technology concerning security elements in fiber layers, in particular paper layers, is well mastered, and provides very high levels of guarantee in terms of security. For example, mention can be made of watermarks that present an effect that is it impossible to reproduce by scanner or color photocopier.

The RFID device provides a high level of security by virtue of its ability to store information that is accessible only by means of an appropriate read and/or write appliance. The fact that the RFID device is housed in an inlay layer enables the RFID device to be protected, given that it is generally a fragile part, while also making the RFID device particularly difficult for potential counterfeiters to access.

Finally, the fact that the outer layers of thermoplastic material and the inlay layer are transparent make it possible to check for the presence of security elements in the fiber layer from both sides of the security document.

In an embodiment of the invention, said fiber layer presents dimensions such that at least one margin of the final document is devoid of fiber layer.

The width of the margin devoid of fiber layer preferably lies in the range 0.5 millimeters (mm) to 3 mm.

In particular, all of the margins of the final security document are devoid of fiber layer. This embodiment is particularly advantageous in that it makes it possible to limit any risk of the structure delaminating, as could occur because of poor adhesion between the fiber layer and the outer layers of transparent thermoplastic material or because of a problem of cohesion within the fiber layer. This also makes it possible to limit the attempts of potential counterfeiters to access the fiber layer in order to modify it or replace it.

In an embodiment of the invention, the document includes at least one adhesive layer situated between the recto outer layer of transparent thermoplastic material and the fiber inner layer, and/or between the fiber inner layer and the inlay layer, and/or between the inlay layer and the verso outer layer of transparent thermoplastic material.

In particular, the document includes at least two adhesives layers of different type.

In a preferred embodiment, at least one of the adhesive layers comprises a polyethylene.

In another embodiment, at least one of the adhesive layers comprises an ethylene-vinyl acetate.

In a particular embodiment of the invention, at least one adhesive layer includes a cross-linking agent. This embodiment enables adhesion between the various layers to be reinforced.

In particular, said cross-linking agent of the adhesive layer can be cross-linked under the action of radiation, in particular ultraviolet (UV) radiation.

In an embodiment of the invention, at least one of the outer layers of transparent thermoplastic material includes a security element. This embodiment serves to further reinforce the security level of the security document.

In particular, said security element may be selected from: one or more dyes, and/or particles, and/or luminescent pigments, and/or interference pigments, and/or liquid crystal pigments.

In an embodiment of the invention, the outer layers of transparent thermoplastic material are made of the same material.

In particular, at least one outer layer of transparent thermoplastic material comprises polyethylene terephthalate.

In an embodiment of the invention, the inlay layer comprises a plastics material.

In particular, the inlay layer comprises a material based on polyvinyl chloride (PVC), polyethylene terephthalate (PET), polycarbonate (PC), polyester carbonate (PEC), polyethylene terephtalate glycol (PETG) or on acrylonitrile butadiene styrene (ABS).

In an embodiment of the invention, the inlay layer comprises at least two layers of transparent plastics material, in which the RFID device is housed.

In a preferred embodiment of the invention, the inlay layer does not present any portions of extra thickness. This embodiment is particularly advantageous since the RFID device is thus made undetectable to the touch. For example, at least one inner layer of transparent or translucent material includes a housing for receiving the RFID device.

In an embodiment of the invention, the RFID device of the inlay layer is flush with at least one of the faces of said inlay layer. In particular, the RFID device is flush with both faces of the inlay layer.

In an embodiment of the invention, the RFID device comprises a chip and an antenna enabling contactless transmission. For example, the antenna may comprise a plurality of turns possibly extending over all or part of the surface of the inner layer in said inlay layer.

In an embodiment of the invention, the fiber layer comprises cellulose fibers, in particular cotton fibers and/or synthetic fibers.

In an embodiment of the invention, the fiber layer is a paper layer having thickness of about 100 micrometers (μm).

In a particular embodiment of the invention, the security element of the fiber layer is selected from watermarks, security threads, security fibers, optically variable devices (OVDs), liquid crystals, interference elements, iridescent elements, planchet spots, holograms, magnetic fibers, fluorescent pigments, and combinations thereof.

Preferably, the fiber layer includes at least one watermark.

In an embodiment of the invention, the fiber layer includes at least one zone that is completely devoid of fibers, forming a through "window". By way of example, each window may have an area lying in the range 20 square millimeters ($mm^2$) to 50 $mm^2$, for a length lying in the range 6 mm to 10 mm. This embodiment is very advantageous since, given that the inlay layer and the outer layers of the security document are transparent, the security document will include a zone that is completely transparent in register with the through window. This characteristic is particularly difficult to reproduce.

In another embodiment of the invention, the fiber layer includes a strip that is at least partially transparent and, at least one of the faces of said fiber layer comprises zones devoid of fibers overlying said strip. For example, said strip may be made of transparent plastics material and may include holographic printing or liquid crystals, such that the strip is transparent when looked through. This embodiment also makes it possible to obtain a security document that presents a zone that is at least partially transparent and therefore difficult to reproduce. For example, two zones devoid of fibers may be situated in respective faces of the fiber layer and in register with each other so as to form a through window, with said strip passing across the window.

In another example, the zones of the fiber layer are partially devoid of fibers and are all situated on the same face of said fiber layer, thus forming non-through windows.

In a particular embodiment of the invention, the fiber layer includes a security thread that can be seen on at least one face of the fiber layer in at least one window.

The term "security thread" is used to mean a security element in the form of a strip having a width of less than 10 mm.

In an embodiment of the invention, the fiber layer of the security document includes printing, e.g. offset or ink-jet printing. By way of example, the printing may correspond to unchanging mentions and/or variable mentions of an identity document.

Preferably, said printing includes a photograph, e.g. of the holder of the security document.

In an embodiment of the invention, the fiber layer includes at least one so-called "anti-scratch" security zone providing it with protection against mechanical falsification. This zone comprises a set of regions of reduced thickness (cells) such that any attempt at altering the surface of the fiber layer leads to the fiber layer being pierced. Such a device is described for example in patent application EP 1 252 389. This embodiment is particularly advantageous when the anti-scratching security zone is involved in the printing on the fiber layer, in particular the printing of a photograph.

In an embodiment of the invention, said fiber layer includes perforations, e.g. having an area lying in the range 0.2 $mm^2$ to 7 $mm^2$, for a diameter lying for example in the range 0.5 mm to 3 mm. This embodiment is particularly advantageous since it makes it possible, while assembling the security document, for the layers of transparent thermoplastic material and/or the adhesive layers to diffuse through the fiber layer, thereby bonding together the structure as a whole.

In particular, the perforations form a pattern, such as an alphanumeric pattern and/or a design and/or a symbol, so as to provide the document with additional security.

In an embodiment of the invention, the security document includes an opaque zone situated between the inlay layer and the verso outer layer, with preferably at least a portion thereof overlying the RFID device of the inlay layer. This embodiment is particularly advantageous since it makes it possible to avoid the RFID device being visually identifiable through the inlay layer.

Preferably, the opaque zone situated between the inlay layer and the verso outer layer entirely covers the RFID device.

In an embodiment of the invention, the opaque zone is situated on one face of the inlay layer, in particular its verso face, i.e. its face that faces towards the verso outer layer.

In another embodiment of the invention, said opaque zone is situated on the inner face of the verso outer layer.

In an embodiment of the invention, the opaque zone is constituted by printing. By way of example the opaque zone may be a zone of silkscreen printing.

In a particular embodiment, said opaque zone extends over a region corresponding to one edge of the fiber layer, over a length that corresponds to the length of the fiber layer, and over a width that lies in the range one-third to one-fourth of the width of the fiber layer.

In a particular embodiment, said opaque zone is white in color.

In an embodiment, the opaque zone also presents color printing, in particular black printing. In particular, the color printing may be string of characters, such as letters and digits, e.g. constituting a code that can be read by a machine, a bar code, and corresponding for example to encoding information that is printed on the fiber layer of the security document.

In an embodiment of the inventions when the fiber layer presents dimensions such that at least one margin of the final document is devoid of fiber layer, at least one margin of the security document devoid of fiber layer is provided with at least one compensation layer.

In particular, all of the margins of the security document can be provided with compensation layers. In this way, it is possible to obtain a final document that does not present any reduced thickness at its margins.

Preferably, said compensation layer is transparent, such that the margins of the final security document are transparent. For example, at least one compensation layer is made of plastics material, such as a polyethylene terephthalate or a polyvinyl chloride.

In a particular embodiment of the invention, said compensation layer includes at least one security element. By way of example, it may be constituted by luminescent, in particular fluorescent, particles or pigments.

Preferably, the maximum thickness of the final security document lies in the range 0.2 mm to 3 mm.

In an embodiment of the invention, the security document is an identity document and/or an authentication document. For example, the security document is an identity card, a driving license, a page of a passport, an access badge.

In particular, the security document of the invention is an identity card presenting dimensions complying with the ID-1 format, i.e. a length of 85.60 mm and a width of 53.98 mm, which corresponds to the format of bank cards. This embodiment is most advantageous since numerous pieces of industrial equipment, e.g. for personalization purposes, are adapted to this format, and the format is also practical for the final user to handle.

The invention also provides a method of fabricating the above-described security document.

According to the invention, the fabrication method comprises the following steps:

a) assembling together a fiber layer including at least one security element and at least one layer of transparent or translucent material including an RFID device (inlay layer);

b) personalizing the fiber layer by printing;

c) assembling together the fiber layer and said at least one layer of transparent or translucent material including an RFID device with recto and verso outer layers of transparent thermoplastic material, the recto outer layer being assembled with the fiber layer and the verso outer layer being assembled with said at least one layer of transparent or translucent thermoplastic material including an RFID device.

The fabrication method of the present invention presents the advantage of being capable of being implemented in a plurality of independent steps, and in different locations. For example, the fiber layer may be assembled with the inlay layer on one site, while the fiber layer is personalized on another site, e.g. by the official administration issuing the card.

In an implementation of the invention, the unchanging mentions of the security document are printed on the fiber layer, in particular by offset printing, before said fiber layer is assembled with the inlay layer.

Preferably, the fiber sheet comprises at least one window, which is or not a through window.

Preferably, the fiber sheet comprises at least one security element chosen among watermarks, security threads, perforations and/or a strip at least partially transparent visible in a window.

In an implementation of the invention, assembly step a) of the inner fiber layer and the inlay layer is made by means of an adhesive layer.

In particular, said adhesive layer is deposited on the inlay layer.

In an implementation, assembly step a) is performed cold (without bringing external temperature), in particular by cold pressing.

In an implementation, assembly step a) is performed hot, in particular by hot pressing. Step a) is for example performed at a temperature comprised between 40 and 300° C., preferably between 100 and 150° C., depending on the type of the adhesive layer or on the type of the face of the inlay layer facing the fiber layer.

In an implementation of the invention, the fiber layer is personalized by ink-jet printing the variable mentions of the security document.

In an implementation of the invention, after the inner fiber layer and the inlay layer have been assembled together in step a), said layers are cut to their final format, e.g. flush cut.

In an implementation, step c) of assembling the outer layers with the assembly comprising the fiber layer and said inlay layer as assembled together in step a) is performed by means of at least one adhesive layer. In particular, each of the outer layers of transparent thermoplastic material is covered in an adhesive layer.

In an implementation, assembly step c) is performed cold (without bringing external temperature), in particular by cold pressing.

In an implementation, assembly step c) is performed hot, in particular by hot pressing. Step c) is for example performed at a temperature comprised between 40 and 300° C., preferably between 100 and 130° C., depending on the type of the different layers, for example in card laminators.

In an implementation, the recto and verso outer layers are made on a single sheet of transparent plastics material, said sheet being folded in half during assembly step c) along a fold line situated in the middle of said sheet.

In an implementation of the invention, at least one adhesive layer includes a cross-linking agent, in particular suitable for cross-linking under the action of radiation, e.g. UV radiation.

In particular, when said adhesive layer includes an agent that cross-links under the action of UV radiation, the recto and verso outer layers are selected in such a manner as to be transparent to UV.

The invention is described in greater detail below with the help of the accompanying figures, in which:

FIG. 5b is a plan view from below of the security document of FIG. 5a; and

For reasons of clarity, the relative proportions of the various elements are not complied with.

Figure 1:
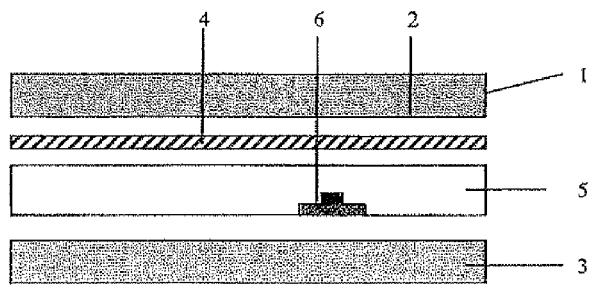
FIG. 1 is a diagrammatic section view of a security document constituting an embodiment of the invention.

FIG. 1 is a section view of a security document (1) constituting an identity card having a length of 85.60 mm and a width of 53.98 mm, constituting an embodiment of the invention. The document (1) comprises two outer layers, a recto layer (2) and a verso layer (3) both made of polyethylene terephthalate, and placed on either side of an inlay layer (5) having a thickness of 400 µm and comprising two layers of PVC and a chip (6) provided with an antenna that is not shown, the chip (6) being flush with one of the faces of the inlay layer (5), and also an internal fiber layer (4) having a thickness of 100 μm and including security elements that are not shown, all of the layers of the security document (1) presenting the same dimensions.

Figure 2:
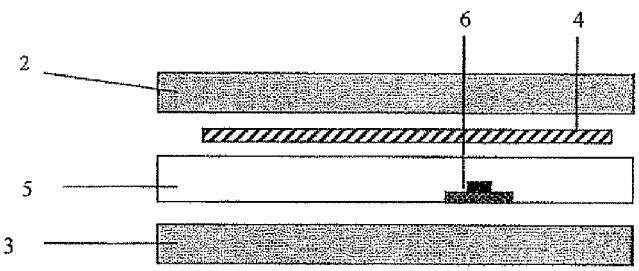
FIG. 2 is a diagrammatic section view of a security document constituting another embodiment of the invention.

FIG. 2 is a section view through a security document (1) similar to that shown in FIG. 1, with the exception that the fiber layer (4) is of dimensions that are smaller than those of the other layers, such that the margins of the security document (1) are transparent.

Figure 3:
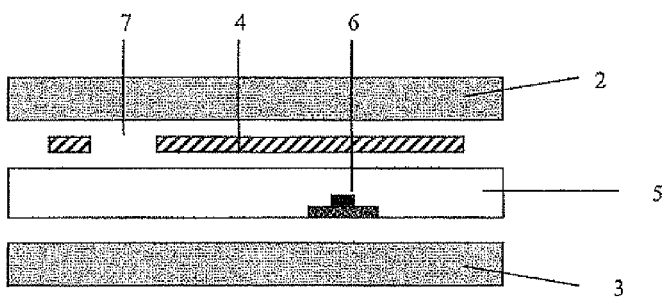
FIG. 3 is a diagrammatic section view of a security document constituting another embodiment of the invention.

FIG. 3 is a section view of a security document (1) similar to that shown in FIG. 2, but in which the paper layer (4) includes a through window (7). In this way, because of the transparency of the inlay layer (5) and of the outer layers (2, 3), the security document (1) presents a zone that is completely transparent, situated in register with the window in the fiber layer (4). This characteristic is particularly advantageous since it is very difficult for potential counterfeiters to reproduce.

Figure 4:
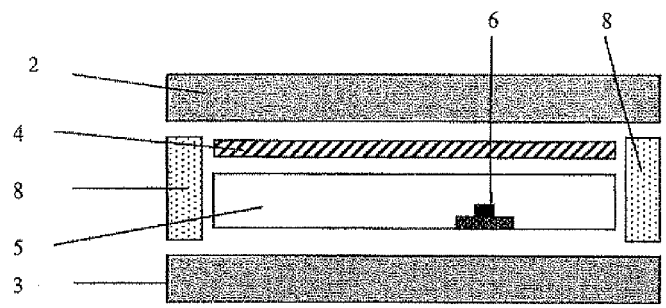
FIG. 4 is a diagrammatic section view of a security document constituting another embodiment of the invention.

FIG. 4 is a section view of a security document (1) similar to that shown in FIG. 2, but in which the inlay layer (5) presents the same dimensions as the fiber layer (4). The security document (1) also includes a transparent compensation layer (8) situated between the transparent outer layers (2, 3) at the margins of the document, such that the final security document presents constant thickness over its entire surface.

Figure 5A:
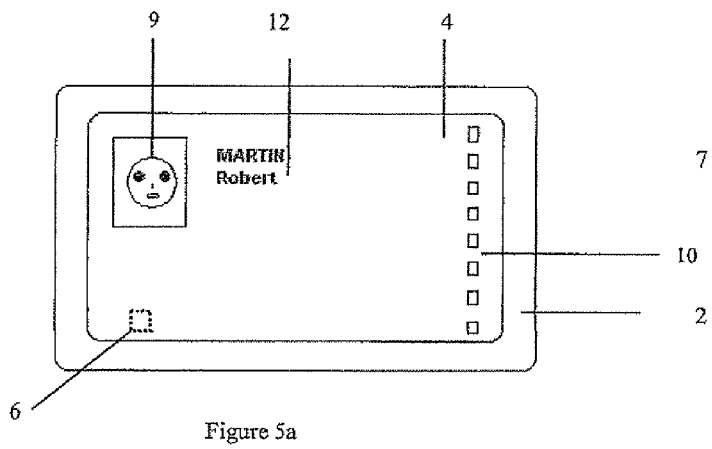
FIG. 5a is a plan view from above of a security document of the invention.

FIG. 5a is a view from above of a security document (1) of the invention, e.g. an identity card. The identity card (1) has transparent margins and includes a fiber layer (4) that can be seen through the recto transparent outer layer (2). For an observer looking at the top of the identity card (1) (the recto face side thereof), the inlay layer (5) including a chip (6) is placed under the fiber layer (4) such that the observer sees the "recto" face of the fiber layer (4), but not the chip (6). The fiber layer (4) includes a security thread (10) incorporated in the bulk of said fiber layer (4) and appearing in non-through windows (7) formed in the fiber layer (4).

The fiber layer (4) also has on its "recto" surface a photograph (9) of the holder of the card, printed in color, together with printed information (12) relating to the bearer.

Figure 5B:
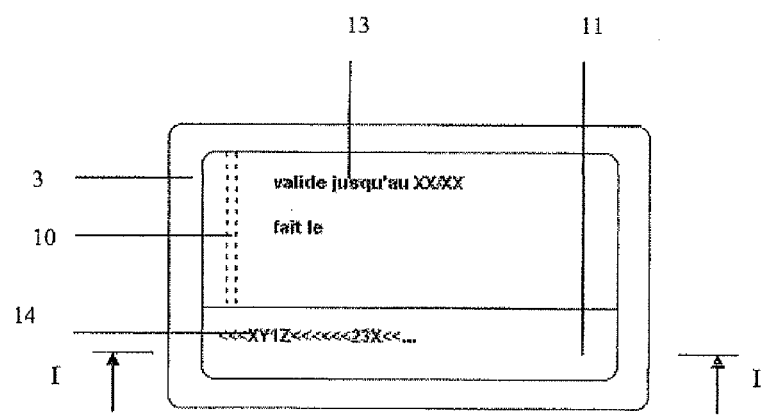

FIG. 5b shows a view of the underside of the document shown in FIG. 5a. The inlay layer (5) is placed under the verso transparent outer layer (3) and the fiber layer (4) is situated under the transparent inlay layer (5) such that it is possible to observe some of the "verso" face of the light layer (4).

The fiber layer (4) presents printed information (13) on its "verso" face. On its face on the verso side of the security document, the transparent inlay layer (5) includes an opaque zone (11) of opaque white ink. This opaque zone (11) is a continuous layer situated in the bottom portion of the card, level with one of the edges of the fiber layer (4) and overlying the chip (6). The opaque zone (11) extends over a length that is equal to the length of the fiber layer (4) and over a width that corresponds to one-third of the width of the fiber layer (4). In this way, the chip (6) is masked on both sides of the inlay layer (5) by the opaque zone (11) on one side, and by the fiber layer (4) on the other side, and is therefore visually undetectable. In the opaque zone (11) there is printed a code line (14), in this example a so-called MRZ code line, corresponding to the information (12, 13) that is printed on the faces of the fiber layer (4). The security thread (10) does not appear on the "verso" face of the fiber layer (4), but can be seen by looking through the card.

Figure 5C:
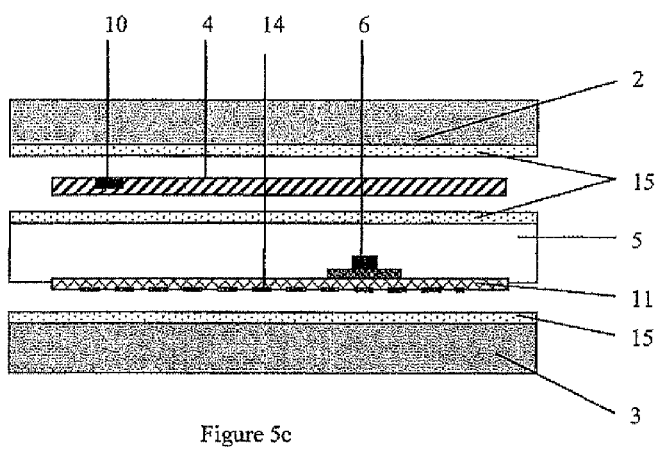
FIG. 5c is a section view through the security document of FIGS. 5a and 5b on a plane I-I.

FIG. 5c is a section view through the opaque zone (11) on a plane I-I showing the same security document (1) as is shown in FIGS. 5a and 5b. The security document (1) has three adhesive layers (15) based on a transparent polyethylene that are disposed respectively between the recto outer layer (2) and the fiber layer (4), between the fiber layer (4) and the inlay layer (5); and between the inlay layer (5) and the verso outer layer (3). The security thread (10) is flush in a non-through window (7) of the recto face of the fiber layer (4).

The invention claimed is:

1. A security document comprising a fiber inner layer having at least one security element, a recto outer layer, and a verso outer layer, the two outer layers being made of transparent thermoplastic material, and an RFID device, the RFID device being housed within at least one inner layer of a material that is transparent or translucent,
said security document presenting a maximum thickness lying in the range 0.2 mm to 3 mm.

2. A security document according to claim 1, wherein all of the margins of the final security document are devoid of fiber layer.

3. A security document according to claim 1, wherein said document includes at least one adhesive layer situated between the recto outer layer of transparent thermoplastic material and the inner fiber layer, and/or between the inner fiber layer and said at least one inner layer of transparent or translucent material containing the RFID device, and/or between the inner layer of transparent or translucent material containing the RFID device and the verso outer layer of transparent thermoplastic material.

4. A security document according to claim 3, wherein said document comprises at least two adhesive layers of different type.

5. A security document according to claim 3, wherein said at least one adhesive layer includes a cross-linking agent.

6. A security document according to claim 5, wherein said adhesive layer is cross-linked under the action of radiation.

7. A security document according to claim 1, wherein at least one of the outer layers of transparent thermoplastic material includes a security element.

8. A security document according to claim 1, wherein said outer layers of transparent thermoplastic material are made of the same material.

9. A security document according to claim 1, wherein at least one outer layer of transparent thermoplastic material comprises a polyethylene terephthalate.

10. A security document according to claim 1, wherein the security element of said fiber layer is selected from: water marks, security threads, security fibers, OVDs, liquid crystals, interference elements, iridescent elements, planchet spots, holograms, magnetic fibers, and combinations thereof.

11. A security document according to claim 1, wherein the fiber layer includes at least one zone that is partially devoid of fibers.

12. A security document according to claim 1, wherein said fiber layer includes perforations.

13. A security document according to claim 12, wherein said perforations form a pattern.

14. A security document according to claim 13, wherein said perforations form an alphanumeric pattern and/or a design and/or a symbol.

15. A security document according to claim 1, wherein the RFID device comprises a chip provided with an antenna.

16. A security document according to claim 1, wherein said at least one inner layer of transparent or translucent material including the RFID device is made of a plastics material.

17. A security document according to claim 1, wherein said at least one inner layer of transparent or translucent material including the RFID device comprises at least two layers of transparent plastics material in which the RFID device is housed.

18. A security document according to claim 1, wherein said at least one inner layer of transparent or translucent material including the RFID device does not present portions of extra thickness.

19. A security document according to claim 1, wherein the RFID device of the inner layer of transparent or translucent material is flush with at least one of the faces of said at least one inner layer of transparent or translucent material.

20. A security document according to claim 1, wherein said at least one inner layer of transparent or translucent material including the RFID device presents the same dimensions as the final security document.

21. A security document according to claim 1, wherein said document is an identity card, a driving license, a page of a passport, an access badge.

22. A security document comprising a fiber inner layer having at least one security element, a recto outer layer, and a verso outer layer, the two outer layers being made of transparent thermoplastic material, and an RFID device, the RFID device being housed within at least one inner layer of a material that is transparent or translucent, said fiber layer presenting dimensions such that at least one margin of the final document is devoid of fiber layer, and said margin of the final security document that is devoid of fiber layer presenting a width lying in the range 0.5 mm to 3 mm.

23. A security document according to claim 22, wherein the margin(s) of the document devoid of fiber layer are provided with at least one compensation layer such that the final security document does not present any reduced thickness at its margins.

24. A security document according to claim 23, wherein said at least one compensation layer comprises transparent plastics material.

25. A security document according to claim 23, wherein said at least one compensation layer includes a security element.

26. A security document comprising a fiber inner layer having at least one security element, a recto outer layer, and a verso outer layer, the two outer layers being made of transparent thermoplastic material, and an RFID device, the RFID device being housed within at least one inner layer of a material that is transparent or translucent, the fiber layer comprising at least one zone that is completely devoid of fibers, forming a window and including at least one strip that is at least partially transparent, at least one of the faces of said fiber layer comprising zones devoid of fibers overlying said strip.

27. A security document comprising a fiber inner layer having at least one security element, a recto outer layer, and a verso outer layer, the two outer layers being made of transparent thermoplastic material, and an RFID device, the RFID device being housed within at least one inner layer of a material that is transparent or translucent, said security document including an opaque zone situated between said at least one inner layer of transparent or translucent material including the RFID device and an outer layer of transparent thermoplastic material.

28. A security document according to claim 27, wherein said opaque zone is situated on a face of said at least one inner layer of transparent or translucent material including the RFID device.

29. A security document according to claim 27, wherein said opaque zone is situated on a face of an outer layer of transparent thermoplastic material.

30. A security document according to claim 27, wherein said opaque zone is situated at least in part overlying the RFID device.

31. A security document according to claim 30, wherein said opaque zone entirely covers the RFID device.

32. A security document according to claim 27, wherein said opaque zone is made by printing.

33. A security document according to claim 27, wherein said opaque zone is white in color.

34. A security document according to claim 27, wherein said opaque zone also presents colored printing.

35. A security document comprising a fiber inner layer having at least one security element, a recto outer layer, and a verso outer layer, the two outer layers being made of transparent thermoplastic material, and an RFID device, the RFID device being housed within at least one inner layer of a material that is transparent or translucent, the fiber layer includes printing and a photograph.

36. A security document according to claim 35, wherein the fiber layer includes a photograph presenting regions of reduced thickness.

* * * * *